(12) United States Patent
Ocheltree et al.

(10) Patent No.: US 6,171,668 B1
(45) Date of Patent: Jan. 9, 2001

(54) WHITE FOOD CASING HAVING LOW TIO$_2$ LOADING

(75) Inventors: Charles Richard Ocheltree, Perrysville, IN (US); Bret Alan Trimmer, Champaign, IL (US)

(73) Assignee: Teepak Investments, Inc., Wilmington, DE (US)

( * ) Notice: Under 35 U.S.C. 154(b), the term of this patent shall be extended for 0 days.

(21) Appl. No.: 08/296,790

(22) Filed: Aug. 26, 1994

(51) Int. Cl.$^7$ ............................ A22C 13/00; B29D 22/00; B29D 23/00
(52) U.S. Cl. ................... 428/34.8; 426/105; 426/129; 426/135; 426/138; 426/277; 426/278; 426/516; 206/802; 138/118.1
(58) Field of Search ........................... 428/34.8; 426/105, 426/278, 129, 135, 138, 277, 516; 206/802; 138/118.1; 229/13.1; 452/21; 427/230

(56) References Cited

U.S. PATENT DOCUMENTS

| | | | |
|---|---|---|---|
| 2,477,767 | 8/1949 | Remer | 99/176 |
| 2,521,101 | 9/1950 | Thor et al. | 99/176 |
| 2,857,283 | 10/1958 | Firth et al. | 99/176 |
| 3,917,894 | * 11/1975 | Coleman | 428/414 |
| 3,935,320 | * 1/1976 | Chiu et al. | 426/105 |
| 4,336,828 | * 6/1982 | Balser et al. | 138/118.1 |
| 4,585,655 | 4/1986 | Sherbanenko | 426/106 |
| 4,670,273 | * 6/1987 | Hammer et al. | 426/105 |
| 4,849,232 | * 7/1989 | Baker et al. | 426/92 |

FOREIGN PATENT DOCUMENTS

| | | |
|---|---|---|
| 2 312 385 | 10/1974 | (DE) . |
| 760 797 | 11/1956 | (GB) . |
| 824 362 | 11/1995 | (GB) . |
| WO 87/00429 | 1/1987 | (WO) . |

OTHER PUBLICATIONS

Nakagawa, Y., Jpn J. Pap. Technol. 1989, No. 10, Oct. 1989, pp. 13–16 (Abstract).
Pulp Pap. Can., vol. 77, No. 4, Apr. 1976, pp. 19–21, 23–23 (Abstract).
Knowles, E., et al., Pulp Pap. Can. vol. 76, No. 6, Jun. 1975, pp. 23–29, (Abstract).
Nakagawa, Y., "Properties and Applications for Color Pigments used on Coated Paper" Paper Pulp Technology Times, Oct., 1989.

* cited by examiner

Primary Examiner—Nasser Ahmad
Assistant Examiner—John J. Figueroa
(74) Attorney, Agent, or Firm—Michael L. Dunn

(57) ABSTRACT

An improved white food casing comprising regenerated cellulose containing titanium dioxide pigment in a weight ratio of less than 0.5 to regenerated cellulose in the casing and containing from about 0.3 to about 1.2 milligrams per square meter of casing of a water insoluble violet pigment. The titanium dioxide pigment and violet pigment are uniformly dispersed in the regenerated cellulose without agglomeration. The food casing usually has an optical density at least as high as a similar food casing containing fifteen percent more titanium dioxide pigment and no violet pigment. The food casing desirably contains titanium dioxide in an amount of less than 15 and preferably less than 13 grams per square meter of food casing. The invention also includes an improved method for making a white food casing comprising cellulose regenerated from viscose having titanium dioxide incorporated therein; wherein the improvement comprises uniformly dispersing titanium dioxide pigment into viscose at a ratio of less than 0.5 titanium dioxide to viscose; uniformly dispersing a water insoluble violet pigment into the viscose in an amount which will result in from about 0.3 to about 1.2 milligrams per square meter of surface area of the casing; and extruding and coagulating the resulting viscose onto a fiber web in the shape of a tube to form a white tubular food casing. The violet pigment is selected to be stable to and alkalized to a pH of at least 7.5 prior to incorporation into the viscose.

8 Claims, No Drawings

WHITE FOOD CASING HAVING LOW TIO₂ LOADING

BACKGROUND OF THE INVENTION

This invention relates to white food casing and particularly such food casings as are used to package materials such as sausages.

Traditionally there has been a demand for sausage meats packaged in a white food casing. This has usually been accomplished by incorporating titanium dioxide into the sausage casing, which is usually a regenerated cellulose sausage casing which is commonly fiber reinforced, e.g. with cellulose fiber.

Unfortunately there have been problems associated with regenerated cellulose and other sausage casings loaded with titanium dioxide to obtain a white color. In particular, the casing was required to contain a high loading of titanium dioxide to obtain sufficient opacity. Such casings caused brown streaks in final customer product. The titanium dioxide often caused stiffness in the casing which was difficult to reel and which often resulted in folds which in turn caused permanent creasing with resulting poor printing characteristics, and the color of the casing was usually slightly yellow instead of pure white. Additionally the high $TiO_2$ loading caused uneven viscose distribution on the casing and pigment distribution was not as good as desired.

BRIEF DESCRIPTION OF THE INVENTION

There is therefore a need for a pure "white" food casing, especially for use in packaging of sausage meats, which does not have the disadvantages described above.

The invention comprises an improved white food casing comprising regenerated cellulose containing titanium dioxide pigment in a weight ratio of less than 0.5 to regenerated cellulose in the casing and containing from about 0.3 to about 1.2 milligrams per square meter of casing of a water insoluble violet pigment. The titanium dioxide pigment and violet pigment are uniformly dispersed in the regenerated cellulose without agglomeration.

The food casing usually has an optical density at least as high as a similar food casing containing fifteen percent more titanium dioxide pigment and no violet pigment. Furthermore the food casing is nearly pure white in color, has improved flexibility over prior titanium dioxide white food casings of similar opacity, does not cause streaking of contained food product, and has improved reeling characteristics. The viscose and pigment distribution was improved over a similar casing with a similar opacity and higher titanium dioxide loading and no violet pigment.

The food casing desirably contains titanium dioxide in an amount of less than 15 and preferably less than 13 grams per square meter of food casing.

The invention also includes an improved method for making a white food casing comprising cellulose regenerated from viscose having titanium dioxide incorporated therein; wherein the improvement comprises uniformly dispersing titanium dioxide pigment into viscose at a ratio of less than 0.5 titanium dioxide to viscose; uniformly dispersing a water insoluble violet pigment into the viscose in an amount which will result in from about 0.3 to about 1.2 milligrams per square meter of surface area of the casing; and extruding and coagulating the resulting viscose onto a fiber web in the shape of a tube to form a white tubular food casing. The violet pigment is selected to be stable to and alkalized to a pH of at least 7.5 prior to incorporation into the viscose.

DETAILED DESCRIPTION OF THE INVENTION

The white food casing of the invention is to be used for packaging food products, especially sausage products. The food casing comprises regenerated cellulose, which is usually regenerated from xanthate viscose. The food casing is usually a fibrous food casing, i.e. it comprises regenerated cellulose as a continuous phase over a reinforcing fibrous web, which is usually in the form of a cellulose fiber paper. The casing may, however, be a non-reinforced casing product in the form of an extruded and coagulated viscose. In essentially all cases, the casing is in the form of a tube. Methods for manufacturing fibrous and unreinforced food casings which comprise regenerated cellulose are well known to those skilled in the art.

The titanium dioxide pigment, comprises comminuted and dispersed titanium dioxide, as well known to those skilled in the art. Often dispersing aids, such as surfactants are present. Other additives such as preservatives may also be present. The particle size of the particles in the titanium dioxide pigment are quite small and may be submicron in size.

In accordance with the invention, the quantity of titanium dioxide pigment required to obtain a given opacity may be reduced when compared with the quantity of titanium dioxide in previously known white food casings which comprise regenerated cellulose. In previously known food casings comprising regenerated cellulose, the ratio of titanium dioxide pigment to regenerated cellulose was usually greater than 0.5 and often greater than 0.55 in order to obtain the desired opacity. In accordance with the present invention, the same opacity can be obtained at weight ratios of titanium dioxide to regenerated cellulose of less than 0.5 and usually as low as about 0.4 or lower.

The quantity of titanium dioxide present in the casing of the invention based upon surface area of casing is usually below 15 grams per square meter, preferably below 14 grams per square meter and most preferably below 13 grams per square meter of casing to obtain a target optical density (opacity) of greater than 0.6. Previously known white casings comprising regenerated cellulose commonly contained from 16 to 18 grams of titanium dioxide per square meter of casing. Optical density (OD) as used herein is defined as follows:

$$\text{Optical Density} = \text{Log}_{10} \frac{\text{Intensity of Incident Light}}{\text{Intensity of Transmitted Light}}$$

In accordance with the present invention the lower required quantity titanium dioxide has been unexpectedly found to be due to incorporation of a very low percentage of a water insoluble violet pigment. It has further been found that to be effectively uniformly dispersed into the viscose, the pigment must be alkalized, e.g. to from a pH of 7.5 to 12 desirably prior to incorporation. Such pigment must therefore be stable at such a pH, i.e. it should not precipitate, agglomerate, or decompose at the desired pH or in the viscose. A number of suitable violet pigments may be used including blends of red and blue pigments.

For the purposes of this invention from about 0.3 to about 1.2 milligrams per square meter of casing is a preferred concentration of the violet pigment which is usually less than 0.1 percent of the concentration of titanium dioxide pigment. This exceedingly small concentration of violet pigment surprisingly permits the elimination of from 5 to 30% of the titanium dioxide while maintaining comparable optical density.

An especially suitable violet pigment for the purposes of this invention is Violet #23 having Color Index Number 51319. This pigment may be obtained by condensing 3-amino-9-ethylcarbazole with chloranil in trichlorobenzenes.

In accordance with the present invention, the casing is made by known means except that the quantity of added titanium dioxide pigment is reduced and the low concentration of violet pigment is added.

In particular titanium dioxide pigment and violet pigment is dispersed into the viscose before the casing is formed and the viscose is regenerated. Concentrations added to the viscose are as described above. To prevent decomposition and interference with the properties of the viscose, the violet pigment is desirably first alkalized to a pH of from 7.5 to 11, preferably from 8 to 10. Any suitable alkalizing agent such as sodium hydroxide may be used. The titanium dioxide pigment and violet pigment may be added separately or together. For simplicity of operations, the pigments are commonly blended together and added simultaneously.

The following example serves to illustrate and not limit the present invention:

A pigment slurry is made by blending 39.876% of titanium dioxide pigment (white pigment number 6, CI index number 77891) with 0.00234% of Violet 23 pigment (CI index number 51319) with Titanium dioxide representing 99.994% of the total pigment and Violet number 23 representing 0.006% of the total pigment. the pigment slurry is then add mixed with xanthate viscose prior to extrusion onto a fibrous web in accordance with known operating procedures. The pigment add-on in the finished product is about 12.5 g/m$^2$ of TiO$_2$ and 0.723 mg/m$^2$ of Violet 23. The resulting product had an optical density of about 0.6. which would have required at least about 16 g/m$^2$ titanium dioxide add on in the absence of the violet pigment used in accordance with the present invention. In addition, the casing had improved flexibility, whiteness, and pigment distribution and did not cause streaking in contained product when compared with a white casing having a similar optical density made without the violet pigment in accordance with the present invention. Viscose distribution is improved.

What is claimed is:

1. An improved white food casing comprising regenerated cellulose containing titanium dioxide pigment in a weight ratio of less than 0.5 to regenerated cellulose in the casing and less than 15 grams per square meter of casing and containing a water insoluble violet pigment in an amount of less than 0.1 percent of the titanium dioxide in the casing and from about 0.3 to about 1.2 milligrams per square meter of casing, the quantity of combined titanium dioxide and water insoluble violet pigment being sufficient to impart an optical density of at least 0.6, said titanium dioxide pigment and violet pigment being uniformly dispersed in the regenerated cellulose without agglomeration.

2. The food casing of claim 1, wherein said food casing has an optical density at least as high as the same food casing except containing fifteen percent more titanium dioxide pigment and no violet pigment.

3. The food casing of claim 1 wherein the food casing is a fibrous food casing.

4. The food casing of claim 1 wherein the titanium dioxide is in an amount less than 15 grams per square meter of surface area of the casing.

5. The food casing of claim 1 wherein the titanium dioxide is present in an amount of less than 13 grams per square meter of surface area of the casing.

6. An improved method for making a white food casing comprising cellulose regenerated from viscose having titanium incorporated therein; wherein the improvement comprises uniformly dispersing titanium dioxide pigment into viscose at a ratio of titanium dioxide to viscose of less than 0.5; uniformly dispersing a water insoluble violet pigment into the viscose in an amount which will result from about 0.3 to about 1.2 milligrams of violet pigment per square meter of casing and in an amount which is less than 0.1 percent of the incorporated titanium dioxide, the quantity of combined titanium dioxide and violet pigment being sufficient to obtain an optical density of at least 0.6 in the food casing; and extruding and coagulating the resulting viscose onto a fiber web in the shape of a tube to form a white tubular food casing, said violet pigment being stable to and alkalized to a pH of at least 7.5 prior to incorporation into the viscose.

7. The method of claim 6 wherein the titanium dioxide is incorporated into the viscose in an amount which will result in less than 15 grams per square meter of food casing.

8. The method of claim 6 wherein the titanium dioxide is incorporated into the viscose in an amount which will result in less than 13 grams per square meter of food casing.

* * * * *